US006757916B2

(12) United States Patent
Mah et al.

(10) Patent No.: US 6,757,916 B2
(45) Date of Patent: Jul. 6, 2004

(54) PRESSURE APPLYING GARMENT

(75) Inventors: Donald Mah, Richmond (CA); Rita Ciammaichella, Langley (CA); Ping Yin Sheu, Delta (CA)

(73) Assignee: Mustang Survival Corp., Richmond (CA)

( * ) Notice: Subject to any disclaimer, the term of this patent is extended or adjusted under 35 U.S.C. 154(b) by 176 days.

(21) Appl. No.: 10/229,100

(22) Filed: Aug. 28, 2002

(65) Prior Publication Data

US 2004/0040064 A1 Mar. 4, 2004

(51) Int. Cl.[7] .............................................. A41D 13/12
(52) U.S. Cl. ................. 2/456; 2/2.14; 2/905; 2/DIG. 3; 600/20; 600/388
(58) Field of Search ........................... 2/456, 458, 2.11, 2/2.14, 2.17, 69, 102, 905, DIG. 3, 81; 128/DIG. 20; 600/20, 393, 388; 602/13

(56) References Cited

U.S. PATENT DOCUMENTS

| | | | | |
|---|---|---|---|---|
| 3,523,301 A | * | 8/1970 | Davis et al. | 2/2.14 |
| 5,003,630 A | | 4/1991 | Bassick et al. | |
| 5,007,893 A | * | 4/1991 | Row | 600/20 |
| 5,027,437 A | | 7/1991 | Reddemann et al. | |
| 5,067,921 A | * | 11/1991 | Bramham | 2/458 |
| 5,146,932 A | | 9/1992 | McCabe | |
| 5,243,706 A | | 9/1993 | Frim et al. | |
| 5,376,067 A | * | 12/1994 | Daneshvar | 602/13 |
| RE34,883 E | * | 3/1995 | Grim | 602/19 |
| 5,437,610 A | * | 8/1995 | Cariapa et al. | 128/DIG. 20 |
| 5,582,583 A | * | 12/1996 | Ballantyne | 602/20 |
| 5,891,065 A | * | 4/1999 | Cariapa et al. | 601/152 |
| 6,209,144 B1 | * | 4/2001 | Carter | 2/458 |
| 6,315,009 B1 | * | 11/2001 | Jayaraman et al. | 2/905 |
| 2002/0042585 A1 | | 4/2002 | Kloccker | |
| 2003/0074711 A1 | * | 4/2003 | Iversen | 2/69 |

FOREIGN PATENT DOCUMENTS

CA            672429       10/1963

OTHER PUBLICATIONS

Pressure therapy in the treatment of post–burn hypertrophic scar—A critical look into its usefulness and failacies by pressure monitoring Cheng et al Burns 10, 154–163 1984.
Current Aeromedical Issues in Rotory Wing Operations Roj et al.
The Tactile Situation Awareness System in Rotory Wing Aircraft: Flight Test Results RTO MP–19. AC/323(HFM) TP/4 Raj et al 1998.

* cited by examiner

Primary Examiner—Rodney M. Lindsey
(74) Attorney, Agent, or Firm—C. A. Rowley

(57) ABSTRACT

A pressure-applying garment particularly suited for locating and applying pressure to transmitters is formed by a main inflatable bladder inflated to first pressure to press its inner wall toward a wearer and conform the inner wall to contours of said wearer and to apply the desired pressure between the wearer and a transmitter interposed between the main bladder and the wearer. A plurality of auxiliary inflatable bladders positioned relative to the main bladder and oriented to having their inner walls facing toward said wearer. The auxiliary bladders are provided with separate inflating systems so that at least some of said auxiliary bladders are inflated to a selected pressure different from (higher than) the first pressure to deform inner wall of its auxiliary bladder to conform with and press towards adjacent portions of said wearer and preferably to apply the desired pressure between the wearer and a transmitter interposed between the auxiliary bladder and the wearer.

20 Claims, 11 Drawing Sheets

PRESSURE APPLYING GARMENT

FIELD OF THE INVENTION

The present invention relates to a garment, more particularly to a garment for applying pressure to a wearer and/or for positioning and applying pressure to transmitters (e.g. tactors or bio-feedback sensors) to press them against the wearer of the garment while accommodating body movement under positive or negative G (gravity pressure).

BACKGROUND OF THE PRESENT INVENTION

Loss of situation awareness (SA) and spatial disorientation (SD) are situations encountered for example by aviators and have been blamed for a significant number of aviation mishaps. SD can occur for example when there are missing or conflicting visual cues (e.g. in fog or white-out conditions) or when flight maneuvers greater than 1-G produce a false perception of rotation to the aviator.

The Tactile Situation Awareness System (TSAS), developed by the US Naval Aerospace Medical Research Laboratory (NAMRL) presents 3 dimensional orientation information to pilots and aircrew by taking advantage of an intuitive response produced upon stimulation of skin tactile receptors. TSAS uses for example, electromechanical or pneumatic transmitters generally known as tactors to provide tactile stimuli to the receptors (skin). The tactors produce small, rapid displacements of the skin, typically perpendicular to the skin surface of enough magnitude to excite the receptors. For example, tactile stimuli applied to the pilot's chest in a fixed-wing aircraft indicate that the nose is going down. In a helicopter, tactile stimuli on the pilot's right side or back indicate that the aircraft is sliding in those directions, helping the pilot to maintain a stationary hover without reference to the ground or instruments.

To maximize the transduction of the tactile stimuli to the skin receptors, the tactors are normally mounted to provide direct contact between the tactor and the skin of the wearer.

This pressure garment's primary function is as a tactor locator system (TLS) to maintain tactor position and press the tactor against the skin by providing a counter pressure of sufficient magnitude to ensure transmission of the stimuli. Furthermore, the counter pressure should remain relatively constant to maintain repeatable tactile stimuli. The pressure that can be provided by a close-fitting garment is largely dependent on the local geometry of the body surface. Obtaining sufficient counterforce against the skin is a challenge particularly over concave body sites such as along the sternum between the pectoral muscles and in the lumbar region, which are among the ideal locations for tactor placement.

An inflatable cooling vest (Frim, J. and Michas, R. D. E, U.S. Pat. No. 5,243,706, issued Sep. 14, 1993; Frim, J. and Michas, R. D. E, CA Patent 2051358, issued Mar. 18, 1997) over the upper torso has successfully functioned as a TLS during rotary wing flight testing (Raj, A. K., Suri, N., Braithwaite, M. G., Rupert, A. (1999) The tactile situation awareness system in rotary wing aircraft: Flight test results. RTO HFM Symposium on "Current Aeromedical Issues in Rotary Wing Operations", RTO MP-19. 16-1 to 16-7) however skin contact was minimal and thus the success was limited.

NAMRL has proposed the use of 8 horizontally spaced (along the height of the user) rows of 12 circumferentially spaced (around the body of the user) tactors. The choice of 12 around the circumference of the garment is based on the hour hand of a clock, which has historically been used to describe location/direction. However, the array is not restricted to this configuration but will depend upon the specific needs of the environment in which TSAS is used.

A TLS providing a minimum of 15 grams (g), of tactor counterforce measured at 1 G (gravitational pressure) with an electromechanical tactor-sized load cell i.e. about 3.0 cm diameter and 7.7 mm thickness was deemed "acceptable" by NAMRL for intensity of the TSAS signal. Rotary-wing flight-testing of this system demonstrated that the information transmitted to the pilot via TSAS is easily interpreted with minimal training (Raj et al., 1999). In these devices the sensations transmitted to the user via the tactors are computer activated by sending the signals to and from the tactors to a suitable computer.

Counter pressure garments have been used for years to protect blood circulation either during shock (McCabe, F. J., U.S. Pat. No. 5,146,932, issued Sep. 15, 1992) or during exposure to increased gravity by aircrew (Clarke, D. M., CA Patent 672429, issued Oct. 15, 1963). Anti-gravity pressure suits (G protection suits) are worn to counter the effect of blood pooling in the lower limbs during unusual aircraft accelerations. Reddemann, H. et al. (U.S. Pat. No. 5,027,437, issued Jul. 2, 1991) combines G protection with active cooling whereas Bassick, J. W. and Dubois, E. A. (U.S. Pat. No. 5,003,630, issued Apr. 2, 1991) combines G protection with passive cooling via evaporation of sweat through vapour permeable bladders. Pressure garments have also been used to treat various medical conditions such as in the treatment of lymphedema (Kloecker, R. J., U.S. Patent Application 2002/0042585 A1, published Apr. 11, 2002) and to reduce scarring in burn patients (Cheng, J. D., Evans, J. H., Leung, K. S. Clark, J. A., Choy, T. T., Leung, P. C. (1984) Pressure therapy in the treatment of post-burn hypertrophic scar—A critical look into its usefulness and fallacies by pressure monitoring. Burns 10, 154–163.). However, there is no known counter pressure garment that conforms to the varied surface geometry of the body. Close fitting garments made of stretchable material such as that sold under the Trademark "Lycra" will contact the skin around the circumference of the body but will not have contact over the areas of concave curvature such as along the chest sternum, upper and lower spine.

At 1 G (i.e. normal G) It has been found that a person can sense the skin displacement resulting from a counterforce on the tactor of 15 g. As G increases, a greater counter force is needed to hold the tactor against the skin such that the skin tactile receptors are sufficiently stimulated for the pilot to sense the signal.

The Lycra garments (pressure applying garments used to treat various medical conditions) tested by Cheng et al. (1984) had no pressure in the areas of concave curvature between the shoulder blades and lower back. To address this problem, they filled the body surface crevices under the garments with foam and similar materials to build up the contour and thus obtain pressure against the skin.

While the addition of foam in these pressure garments for treating medical conditions received limited success, this solution (addition of foam) is not satisfactory for use in a TLS garment as it adds insulation and contributes to heat stress in the cockpit. Also with repeated wear, the foam generally becomes less effective in applying pressure against the skin due to compression set.

The use of such stretchable garments is not satisfactory because after only a few hours of wear, stretch garments tend to lose elasticity making them less effective in applying pressure against the skin. Cheng et al. (1984) observed that the Lycra pressure garments they tested lost fabric elasticity and tension, reducing pressure against the skin after a 12 hour period.

Integrating sensors etc. into the garment and using the garment to hold them against the skin, is not a new concept. The 'SmartShirt' is an example (see http://www.time.com/time/2001/inventions/health/insensor.html) however; such a garment cannot for example provide sensor/tactor contact in the concave areas of curvature of the body. Furthermore obtaining a sufficient counter pressure against the tactors/sensors in a high gravity (G) environment (i.e. during aircraft acceleration) is a limitation that the SmartShirt concept is unlikely to overcome.

BRIEF DESCRIPTION OF THE PRESENT INVENTION

It is an object of the present invention to provide a garment for mounting tactors in strategic locations relative to the body of the user and for applying the desired amount of pressure holding the tactor against the user.

The main objective of the present garment is to provide tactor counter pressure against the skin over areas of the body that include the torso, upper arms and upper legs and other areas providing concave curvatures to the suit. A second objective is to reduce heat stress of aircrew by the removal of metabolic heat via convective cooling when attached to an air source and via the evaporation of sweat through the vapour permeable fabric of the garment.

The present invention could also be used to apply pressure to reduce scarring in burn patients. Broadly the present invention relates to a pressure applying garment comprising a body enclosing garment formed by a main inflatable bladder composed of opposed interconnected inner and outer walls, means interconnecting said inner and outer walls at spaced locations, means for inflating said main inflatable bladder to a first pressure to press said inner wall toward a wearer and conform said inner wall to contours of said wearer, a plurality of auxiliary inflatable bladders each formed by an inner expandable wall and a cooperating outer wall, said inner expandable wall having its outer surface relative to said auxiliary bladder facing toward said wearer when said wearer is wearing said garment, positioning means fixing said auxiliary bladders in selected positions relative to said garment and thereby said wearer when said garment is worn by said wearer, separate means for inflating at least some of said auxiliary bladders to a selected pressure different from said first pressure to deform said expandable inner wall of its auxiliary bladder to conform with and press towards adjacent portions of said wearer when said garment is being worn by said wearer.

Preferably said inner expandable walls of said auxiliary bladders are formed by portions of said inner wall of said main inflatable bladder.

Preferably said pressure applying garment further includes a plurality of transmitters mounted in spaced relationship at strategic locations on said garment in positions wherein said transmitters are located between said inner wall and said wearer when said garment is being worn by said wearer and pressed toward said wearer when said main inflatable bladder is inflated, Preferably said pressure applying garment includes further transmitters associated with said auxiliary bladders and interposed between said expandable inner wall of their respective auxiliary bladder and said wearer when said garment is being worn by said wearer so that pressure in said auxiliary bladders force said further transmitters against said wearer.

Preferably, the positioning means of the auxiliary bladders comprises connecting means interconnecting said inner and outer wall of said main bladder around the outer periphery of each of said auxiliary bladders.

Preferably, the connecting means comprises welds.

Preferably, said auxiliary bladders include means to impede expansion of said cooperating outer wall of said auxiliary bladder.

Preferably, wherein said means to impede expansion of said cooperating outer wall of said auxiliary bladder comprises a stiffener panel interposed in said garment in facing relationship to said outer cooperating wall of said auxiliary bladder.

Preferably, said garment further comprises substantially parallel, elongated stiffener elements positioned in space relationship around the circumference of said garment and having their longitudinal axis extending substantially perpendicular to the circumferential direction of said garment.

BRIEF DESCRIPTION OF THE SEVERAL VIEWS OF THE DRAWINGS

Further features, objects and advantages will be evident from the following detailed description of the preferred embodiments of the present invention taken in conjunction with the accompanying drawings in which.

DETAILED DESCRIPTION OF THE INVENTION

Figure 1:
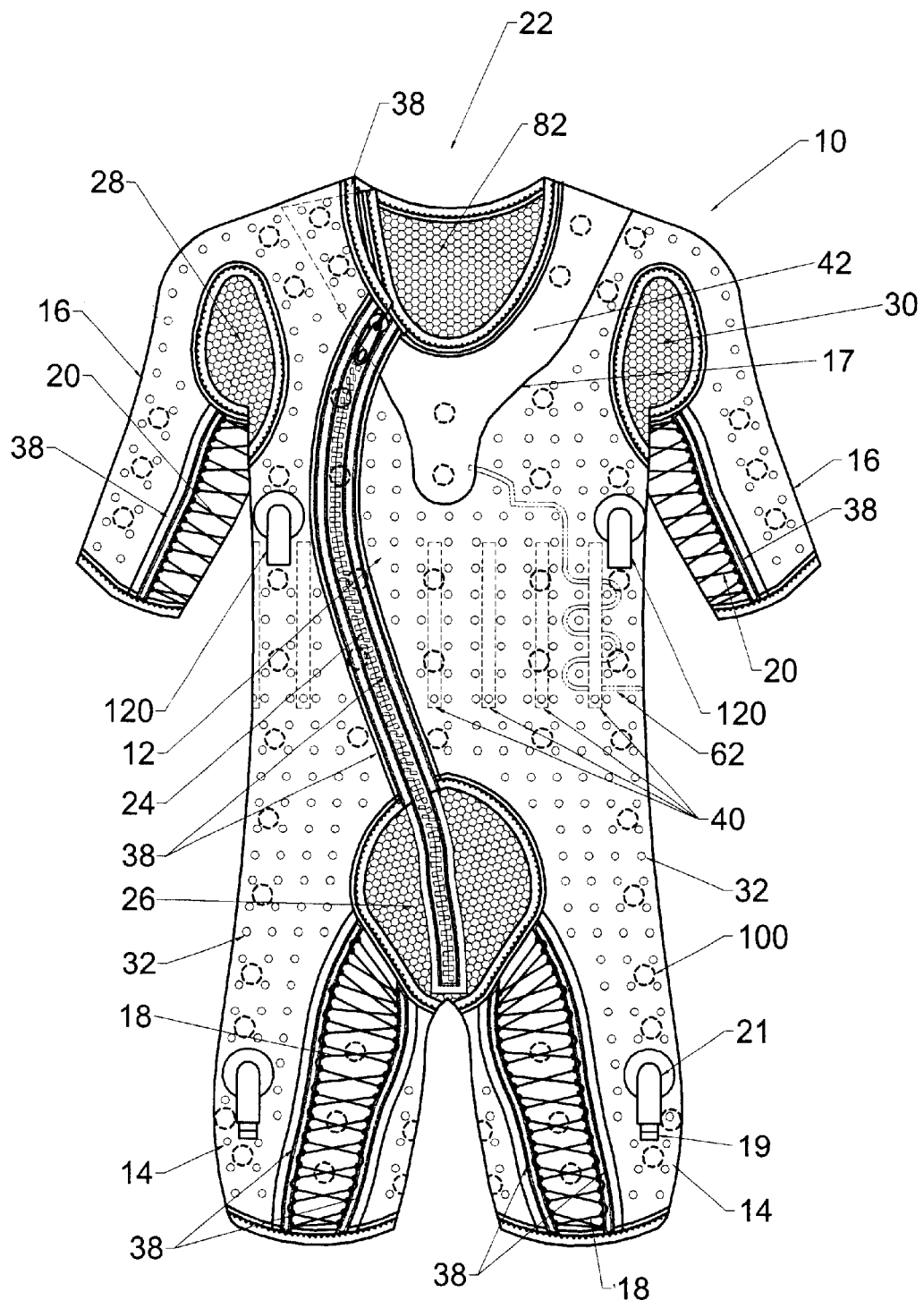
FIG. 1 is a front view showing a suit for applying transmitters against a user

Before describing the invention in detail the term "tactor" as used in this application will be defined. The term tactor is intended to describe mechanisms, mechanical, electrical, pneumatic, hydraulic, etc., or any other suitable means to deliver sensations locally to the wearer. They may be controlled or read individually and/or in groups. For example current tactors are generally in the form of small disks with a flexible surface that can be vibrated for example by pneumatic systems. The force and frequency applied to the wearer by the tactor may be altered to tap on the wearer to provide a distinct sensation that is easily detected by an already visually and aurally saturated pilot. As indicated tactors need not be of the pneumatic type. It is likely that the garment will contain a combination of pneumatic and electromechanical tactors which each transmit a different sensation to the wearer.

In addition to tactors, sensors that monitor for example heart rate or other physiological conditions of the wearer may be integrated into the suit and held against the skin with a sufficient counterforce to allow consistent physiological monitoring.

The term "transmitter" as used herein to describe a tactor or a sensor, however the disclosure refers primarily to tactors as in the specific application tactors were predominantly used.

When the transmitter 100 applies a sensation to the user it is normally controlled by a suitable computer 102 (see FIG. 2 or 7) or the like and similarly, signals from a sensor would generally be sent to a suitable computer 102 for reading and interpretation.

The transmitters 100 shown in dotted lines (hidden) are mounted within the garment 10 and preferably are arranged in vertical columns (o'clock positions) and horizontal rows at the same elevation on the body.

As will be apparent from the following description the garment of the present invention is particularly suited for applying transmitters in the described embodiments primarily tactors 100 at a desired pressure against the wearer usually directly against the skin of the wearer. For impulses from the TSAS transmitters to be sensed by the pilot or other user, the garment must apply a minimum counterforce of 15 g at 1 G and as much as 100 g during increased G. The garment can be inflated and pressurized to maintain counterforce against the tactors or sensors, compensating for increased G, loss in elasticity, and shifts in body position during repeated use of the garment.

The garment may also be used without transmitters to apply pressure against the wearer including the concave portions of the torso via the auxiliary inflatable bladders (as will be described below) in strategic locations and these auxiliary bladders are constructed to expand under internal pressure to conform with and apply pressure in the concave areas with which they are associated (as will be described below). Generally there will be at least one auxiliary bladder for each concave area in which pressure is to be applied.

Figure 2:
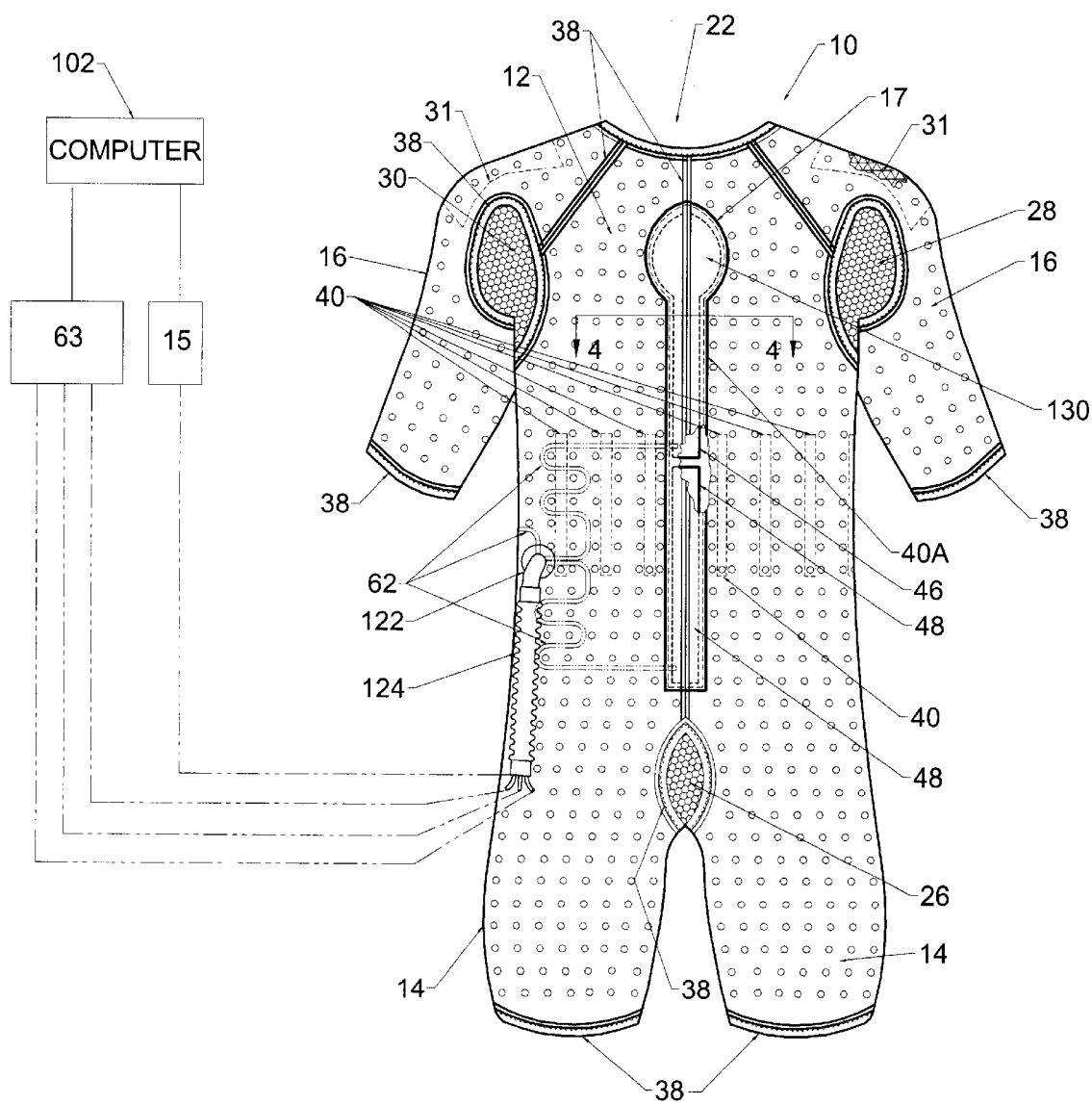
FIG. 2 is a rear view of the garment of FIG. 1

As shown in FIGS. 1 and 2 the garment 10 is formed primarily by an inflatable main bladder 12 having leg receiving portions 14 and arm receiving portions 16 each of which is provided with lacing 18 and 20 respectively for adjusting the tightness of these portions about their respective appendage and thereby provide for size adjustment to maintain customized closeness of fit for each user within the size range of the garment.

A suitable neck opening is provided as indicated at 22 and longitudinally extending closure preferably a zipper 24 as indicated is provided for opening and closing the torso portion of the garment 10 to facilitate doffing and donning of the garment 10. The curvature of the zipper 24 as illustrated defining the shape of the front opening prevents bunching so that the garment 10 does not lift away from the body of the wearer when the zipper 24 is closed.

Suitable mesh portions 26, 28 and 30 are provided one 26 in the crotch area and the other two 28 and 30 one under each arm pit. The mesh in these areas are an extension of the mesh lining 82 (described below) the inside of the garment 10.

Figure 3:
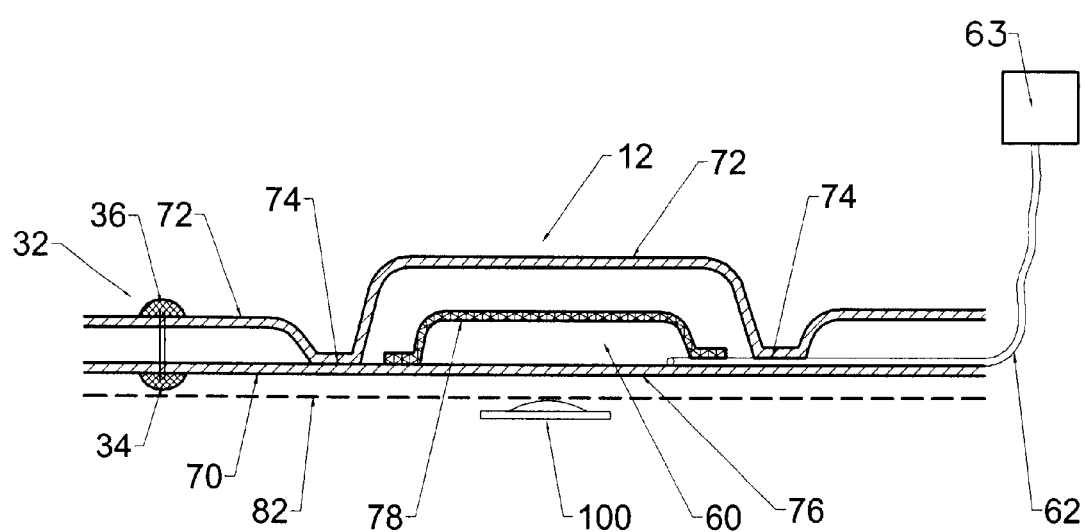
FIG. 3 shows one form of the auxiliary bladders.
Figure 4:
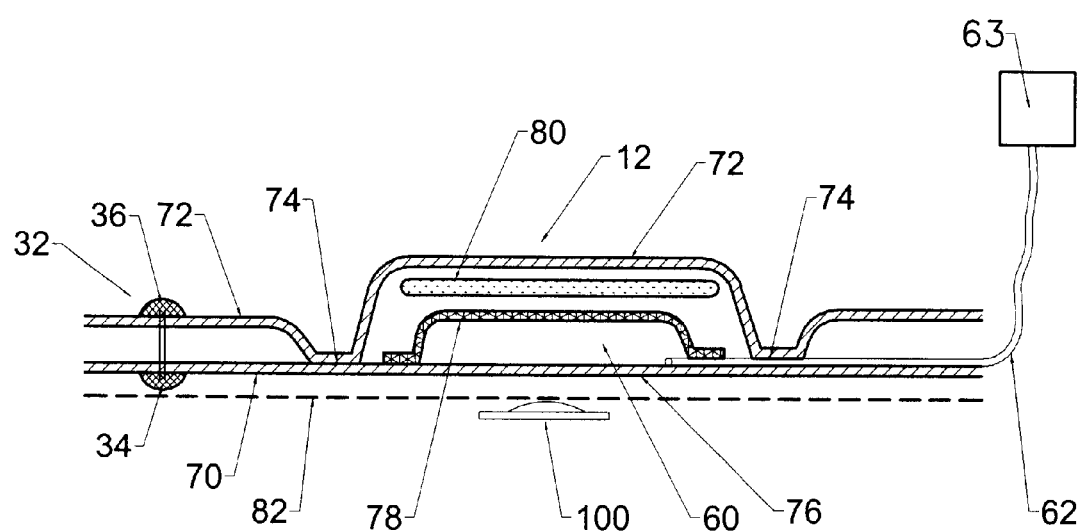
FIG. 4 is a section along the line 4—4 of FIG. 2 showing another form of the invention.
Figure 5:
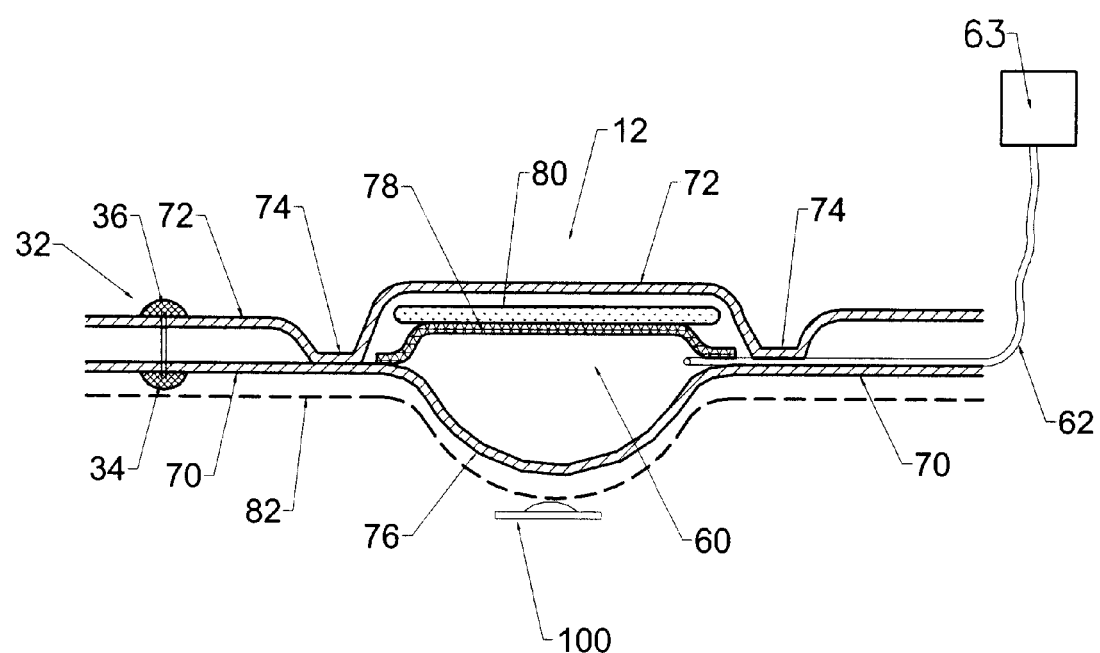
FIG. 5 shows the embodiment of FIG. 4 with the auxiliary bladder inflated

The main bladder 12 of the counter pressure garment 10 comprises a water vapour permeable, liquid water and air impermeable bladder whose expansion upon inflation is limited by sealed spot stitches 32 preferably sewn in a 1 inch (2.5 cm) grid pattern, but not limited to this pattern. Each spot stitch 32 is sealed preferably with polyurethane-based adhesive on the outer surfaces of the inner and outer walls of the bladder 12 as schematically indicated at 34 and 36, respectively (see FIGS. 3, 4 and 5) to prevent air leakage through the stitch holes. To increase convective cooling, the spot stitches 32 can be left unsealed on the inner wall of the main bladder at 34 to allow air to flow from the inside of the garment against the skin.

The peripheral seams 38 of the bladder 12 are joined forming an airtight seal preferably by a thermal bond.

Within the mid-torso section of the main bladder 12, stiffener strips 40 preferably formed of polyethylene are aligned in the vertical direction at circumferentially spaced locations around the circumference to prevent gathering of the main bladder when bending to better insure that the transmitter positions within the garment remain consistent with body movements within an acceptable range. It is preferred to have a back stiffener 40A (FIG. 2) or 80 (FIG. 4) for use with the upper and lower back auxiliary bladders (46 and 48, respectively. See FIG. 2 Three-dimensional spacer material 31 is preferably inserted in the narrow section of the main bladder, between each shoulder and sleeve to facilitate maintaining open channels for airflow.

The main bladder 12 is connected to a suitable source of fluid (air) via the air intake hose 124 and a speciallized connector (not shown) with the interior of the bladder 12 (See FIG. 2). The main bladder 12 is inflated by its own pump 15 and the pressure in the bladder controlled by a computer 102. Venting of fluid (air) through the main bladder to enhance cooling is controllable by the control valve 19 in the air outlet 21 (See FIG. 1).

Within the main bladder 12, auxiliary bladders examples of which are shown at 42, 44, 46, 48, 50 and 52 in FIGS. 1, 2, 6, 7, 8, 9 (and generically at 60 in FIGS. 3, 4 and 5) are positioned in strategic locations about the garment 10 so that when the garment is worn these auxiliary bladders 42, 44, 46, 48, 50 or 52 (or 60) overlie selected areas of the body e.g. in areas that present a concave surface to the inside of the garment 10. These auxiliary bladders 42, 44, 46, 48, 50 and 52 (or 60) which in operation are at a pressure higher than the air pressure in the main bladder 12 so the auxiliary bladders deform and in so doing deform the inner portion of the garment 10 opposite the auxiliary bladder.

In the illustrated arrangements the auxiliary bladders are positioned over the chest, upper and lower back.

Each auxiliary bladder 42, 44, 46, 48, 50 or 52 (or 60) can be individually inflated to a different pressure to obtain the counterforce needed on the body to permit the transmitter 100 to receive or deliver signals from or to the body of the wearer e.g. to transmit the tactor stimuli over the varied surface anthropometry of individual users. Each auxiliary bladder 42, 44, 46, 48, 50 or 52 (or 60) is connected to a suitable source of fluid (air) via its own fluid (air) line 62 (See FIGS. 1 through 6) through the air intake hose 124 with speciallized connector (not shown) to its own suitable inflator pump 63 (see FIGS. 3, 4, 5 and 6). In a typical application of the present invention a corrugated rubber hose 124 fixed to the elbow 122 on the rear left side of the garment 10 attaches by means of a connector (not shown) to suitable air source such as an aircraft air source. The tubing 62 for the auxiliary bladders 60 exit the garment via the hose elbow 122 and hose 124. The pressures in each auxiliary bladder are individually controlled by a computer 102 controlling the pumps 63. This control of the pressure in the main bladder 12 and each of the auxiliary bladder 60 permits the system where in various pumps 15 and 63 are controlled by the computer 102 to ensure that the local pressure between the user and the transmitter 100 is essentially the same at all transmitters or at a selected value at selected transmitters. The computer 102 also may be used for automatic adjustment of the pressures in the bladders 12 and 60 when the user is being subjected to different G forces that may be encountered i.e. the pressure applied to each bladder 12 and 60 may be sensed and this information transferred back to the computer 102 and this information used to control the pressure in each bladder. A suitable sensor may be used to sense the conditions (e.g. G forces being encountered) and transmit this information to the computer 102 for use in adjusting the pressure in each of the bladders 12 and 60.

It is preferable to isolate the air entering the auxiliary bladders from the air entering the main bladder by means of a seam 17 or 74 which may for example be a thermally bonded or glued (See FIGS. 1 through 6) in the main bladder around the perimeter of each auxiliary bladder The auxiliary bladders 42, 44, 46, 48, 50 or 52 (or 60 i.e. generically indicated in FIGS. 3, 4 and 5) are each positioned in the garment preferably by being located between the inner wall 70 and outer wall 72 of the main bladder 12. The bonded seam 74 preferably prevents inflation of the main bladder 12 around the auxiliary bladders.

Figure 6:
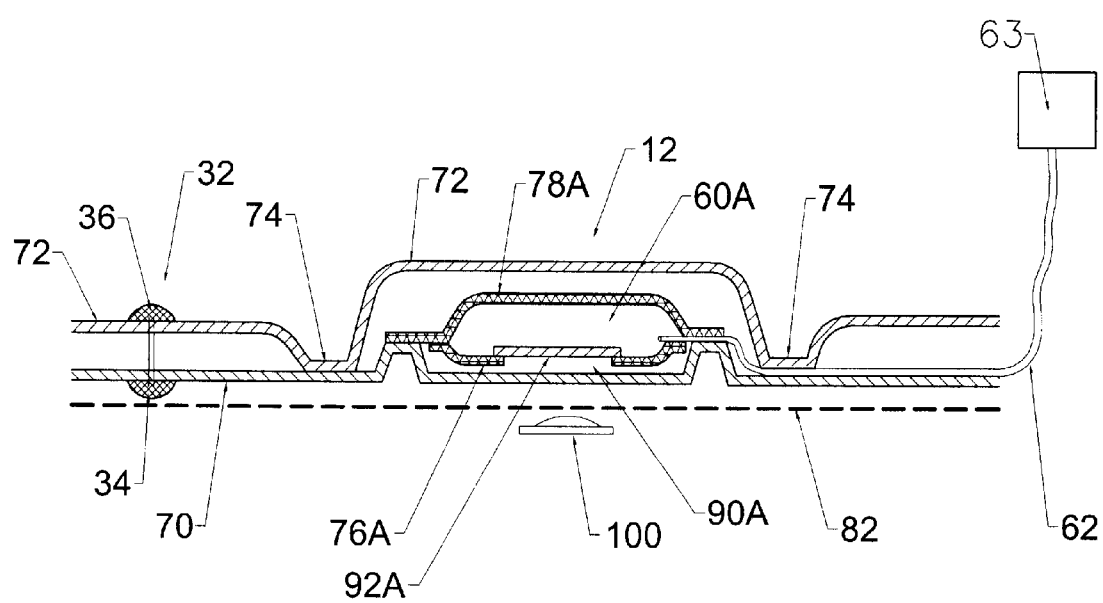
FIG. 6 is a view similar to FIG. 4 showing a modified form of auxiliary bladder structure.

The auxiliary bladders 60 may consist of an outer wall 78 of stretch resistant material thermally bonded or glued on the inside surface of the inner wall 70 of the main bladder 12 to provide an air tight seal there between so that the portion of the wall 70 to which the outer wall 78 is bonded forms the inner wall 76 of the auxiliary bladder. Alternatively the inner wall 76 may be formed by a separate impervious fabric that preferably is more easy to stretch than the material from which the outer wall 78 is made. Thus the inner wall of the auxiliary bladders maybe formed by portions of the inner wall 70 (i.e. 76 in FIGS. 3, 4 and 5) or by separate inner walls 76A, for example, as illustrated in FIG. 6.

The walls 70 and 72 of the main bladder 12 or 76 of the auxiliary bladders are preferably formed by a material sold under the trade name Darlexx 3611.

The outer walls 78 of the auxiliary bladders 60 may be constructed from any suitable stretch resistant material such as polyurethane coated nylon such that at pressure (e.g. 0.5–1.0 psi), the inner auxiliary bladder wall 76 stretches significantly more than the outer auxiliary bladder wall 78. With this unbalanced construction (inner wall 76 less resistant to stretching than the outer wall 78) the auxiliary bladder 60 expands inward toward the wearer and fills the concavities over which it lies and applies the desired pressure to the body in the area of concavity.

To further direct the direction of expansion of the bladder 60 whether the outer wall 78 is made of a stretch resistant fabric or not, a sheet of thin flexible plastic 80 (See FIG. 4) (e.g. 1.5–2 mm thick) may be positioned within the confines of the confining welds 74 and overlying the auxiliary bladder 60 i.e. on the side of the bladder 60 remote from the inner wall 76 to prevent excessive outward inflation and shape the inflated bladders 60 so that they follow the curvature of the underlying concavity of the wearer for example along the spine. By reducing outward inflation in this area, the bladders expand predominately inward to provide better contact of the garment against the skin.

Turning to FIG. 6 a modified auxiliary bladder 60A is shown constructed by thermally bonding the inside layer or wall 76A and outside layer or wall 78A which preferably are made of stretch-resistant polyurethane-nylon. The inside wall 76A has an opening 90A that is sealed with a stretchable patch 92A sealed to the inside wall 76A around the periphery of the hole 90A. The patch 92A is preferably made from stretchable polyurethane-nylon. The use of bladder constructed as shown in FIG. 6 is particularly suited for use over the center sternum and clavicle areas. Upon inflation, greater expansion occurs at the patch 92A where it is needed to apply forces into concave areas thereby providing better skin contact and hence higher counterforce.

Figure 7:
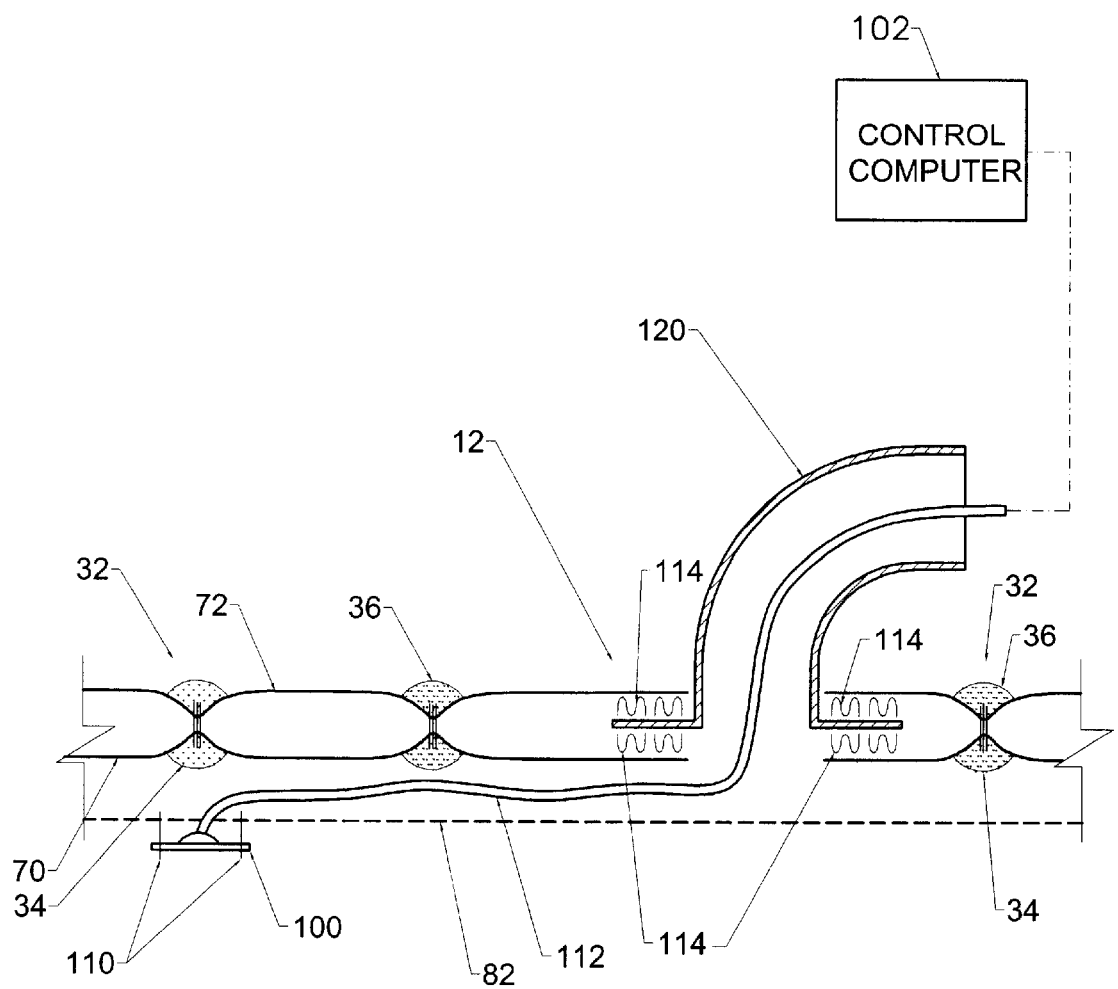
FIG. 7 is a schematic section showing a tactor positioned on the inner liner of the garment and with the connections extending out of the garment or suit.

Inside of the inner wall 70 i.e. adjacent to the body of the wearer and between the inner wall 70 and the body of the wearer is a lining 82 (see FIGS. 1, 3, 4, 5, 6 and 7) formed of an open mesh layer to which transmitters 100 may be attached. The mesh 82 provides a simple means for custom locating each transmitter 100 which as shown schematically in FIG. 7 are each held in position by suitable stitching 110. Alternatively, in the absence of mesh 82, the transmitters 100 may be adhered directly to the garment via an adhesive or hook and pile attachments. The transmitters 100 are interposed between the auxiliary bladders 60 or 60A as well as in other strategic locations between the bladder 12 and the wearer as above described in areas where there is no significant concavity that has to be accommodated.

The transmitters 100 (See FIG. 7) are connected via suitable connectors (wire, pneumatic tubing, etc.) 112 that pass out through the polyurethane or the like elbows 120 that are bonded to the garment as indicated by the welds 114 beneath the arms 16 in order to provide exits for numerous transmitter tubes and/or wires 112 that are provided 1 from each transmitter 100.

For comfort and ease of donning, this mesh 82 extends into areas around the groin and beneath each underarm as described above and indicated at 26, 28 and 30 (See FIG. 1). Though there is no active cooling in these areas the open structure of the mesh allows evaporation of moisture directly from the skin surface.

FIGS. 1, 2, 8, 9, 10 and 11 illustrate different peripheral shapes and selected locations for auxiliary bladders 42, 44, 46, 48, 50 or 52 in the garment 10 of the present invention. In FIG. 1 an auxiliary bladder 42 is illustrated that extends on opposite sides of the neck opening 22 in a Y shape the bottom end of which overlies the area of the sternum of the wearer. The auxiliary bladder 60A having patches 90A strategically located is particularly suited for this type of auxiliary bladder configuration to achieve greater inflation between the pectoral muscles.

Figure 8:
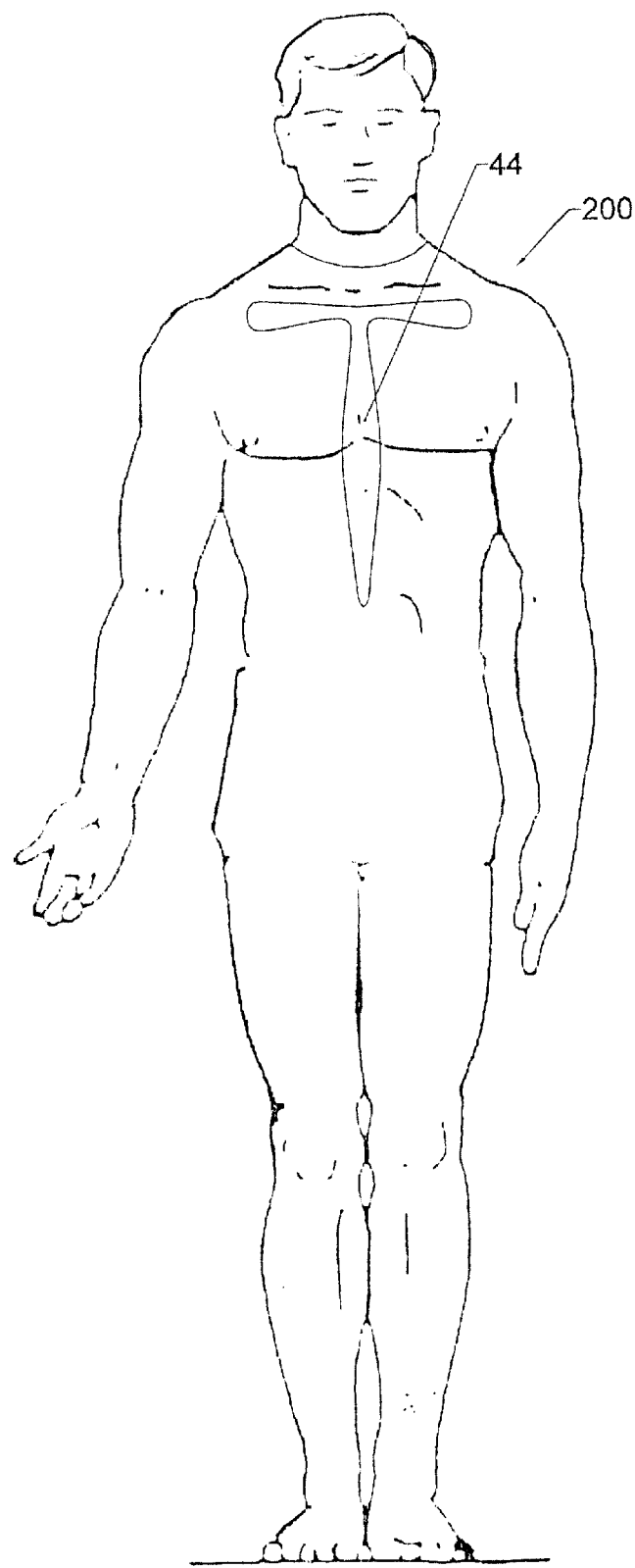
FIG. 8 is a schematic front view showing the position and shape of another form of a front (chest) auxiliary bladder.
Figure 11:
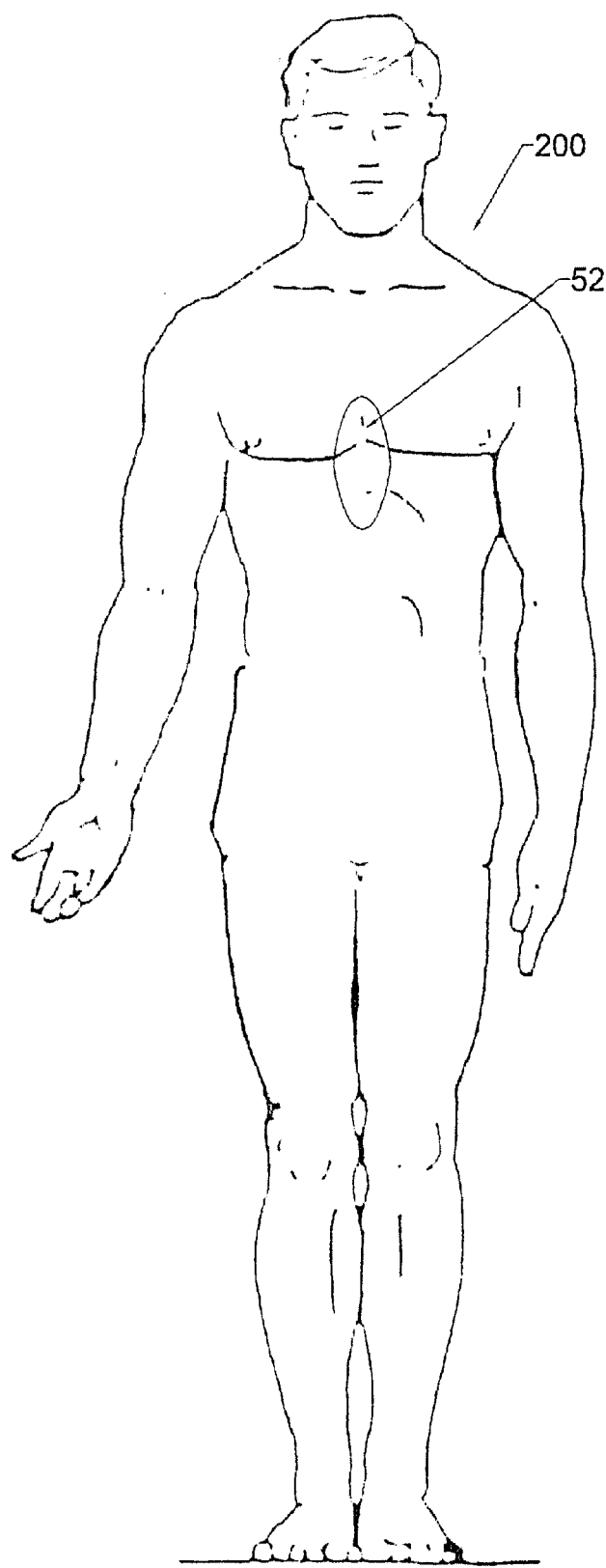
FIG. 11 is a schematic front view showing the position and shape of another form of a front (chest) auxiliary bladder.

FIGS. 8 and 11 show a different form of chest auxiliary bladders as indicated 44 and 52. In the FIG. 8 embodiment the bladder 44 is substantially T shaped with the bottom arm of the T shape extending over the wearer's sternum and the cross arm of the T extending across the chest directly under the wearer's clavicles and garment 10 neck opening 22. In FIG. 11 the bladder 52 is significantly smaller and extends primarily over the mid to lower sternum area, between the wearer's pectoral muscles.

Figure 9:
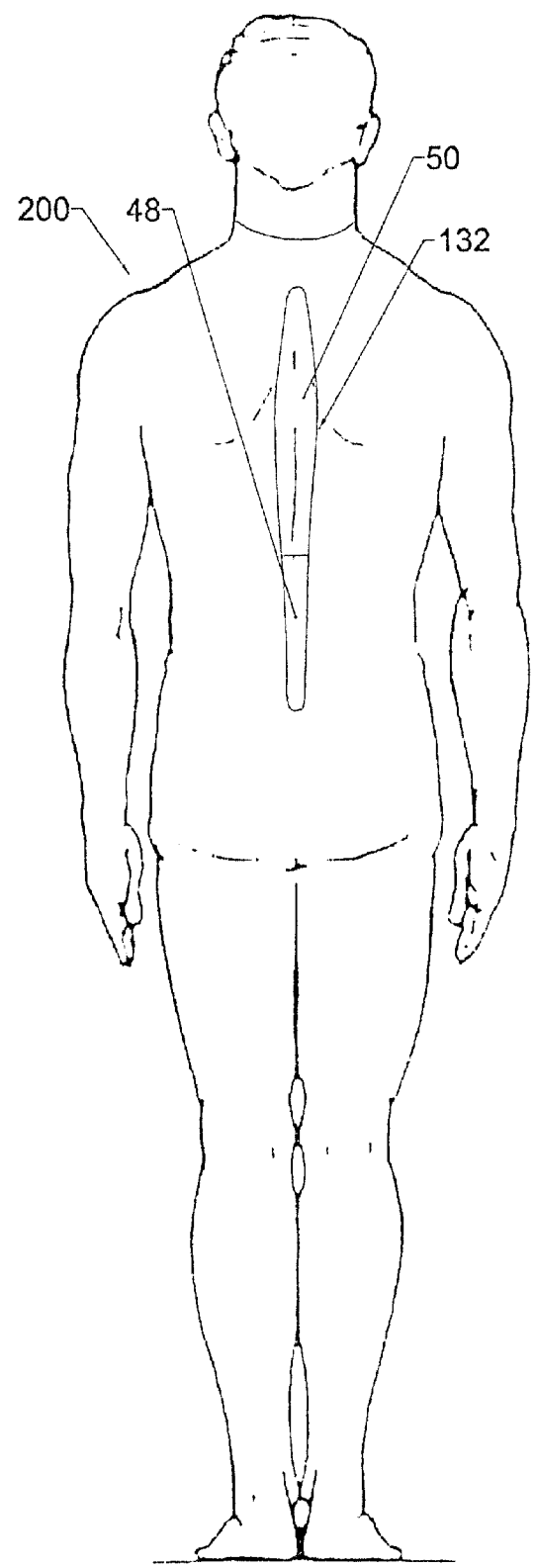
FIG. 9 is a schematic rear view showing the position and shape of an upper and lower back auxiliary bladder.
Figure 10:
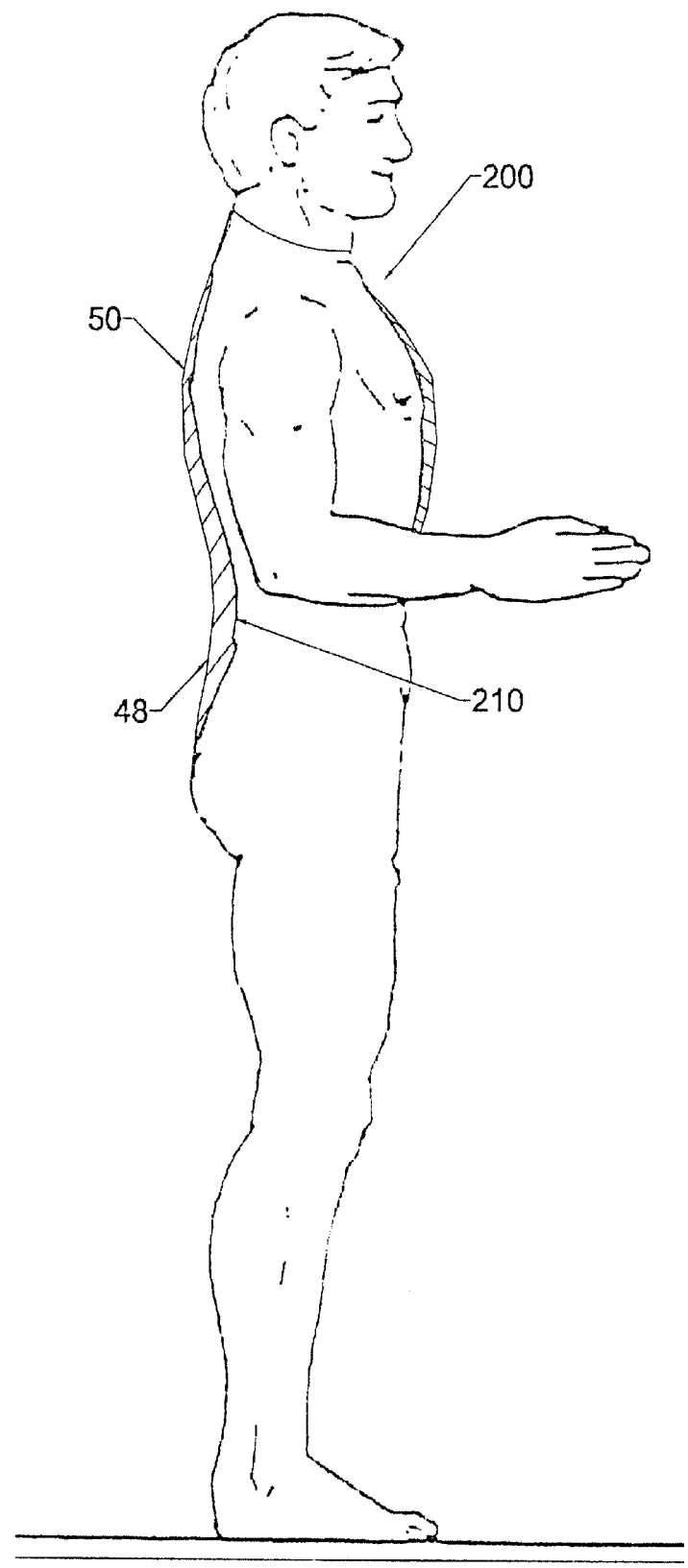
FIG. 10 is a schematic side view showing the position and shape of the inflated upper and lower back auxiliary bladders of FIG. 9 viewed from the side.

FIGS. 2, 9 and 10 show upper and lower back auxiliary bladders 46 and 48 and 50. The upper back bladders 46 and 50 are similar in that they are elongated substantially vertical bladders that extend over the upper part of the backbone of the user, however the bladder 46 has a more rounded portion 130 at its upper end and the bladder 50 has more of an elliptical shape in this upper area as indicted at 132.

It can be seen in FIG. 10 that the upper and lower bladders 50 and 48 when expanded project toward the body 210 of the user or wearer 200.

It will be apparent that the main bladder 12 may be supplied with fluid (air), so that it can function as a cooling garment.

It is also apparent that the main bladder 12 and auxiliary bladders 60 may be inflated from the same air source via a device that allows regulation of pressure within each of the different bladders.

Having described the invention, modifications will be evident to those skilled in the art without departing from the scope of the invention as defined in the appended claims.

We claim:

1. A pressure applying garment comprising a body enclosing garment formed by a main inflatable bladder composed of opposed interconnected inner and outer walls, means interconnecting said inner and outer walls at spaced locations, means for inflating said main inflatable bladder to a first pressure to press said inner wall toward a wearer and conform said inner wall to contours of said wearer, a plurality of auxiliary inflatable bladders each formed by an inner expandable wall and a cooperating outer wall, said inner expandable wall having its outer surface relative to said auxiliary bladder facing toward said wearer when said wearer is wearing said garment, positioning means fixing said auxiliary bladders in selected positions relative to said garment and thereby said wearer when said garment is worn by said wearer, separate means for inflating at least some of said auxiliary bladders to a selected pressure different from said first pressure to deform said expandable inner wall of its auxiliary bladder to conform with and press towards adjacent portions of said wearer when said garment is being worn by said wearer.

2. A pressure applying garment as defined in claim 1 wherein said inner expandable walls of said auxiliary bladders are formed by portions of said inner wall of said main inflatable bladder.

3. A pressure applying garment as defined in claim 1 further including a plurality of transmitters mounted in spaced relationship at strategic locations on said garment in positions between said inner wall and said wearer when said garment is being worn by said wearer and pressed toward said wearer when said main inflatable bladder is inflated.

4. A pressure applying garment as defined in claim 1 further including further transmitters associated with said auxiliary bladders and interposed between said expandable inner wall of their respective auxiliary bladder and said wearer when said garment is being worn by said wearer so that pressure in said auxiliary bladders force said further transmitters against said wearer.

5. A pressure applying garment as defined in claim 1 wherein said auxiliary bladders include means to impede expansion of said cooperating outer wall of said auxiliary bladder.

6. A pressure applying garment as defined in claim 2 wherein said auxiliary bladders include means to impede expansion of said cooperating outer wall of said auxiliary bladder.

7. A pressure applying garment as defined in claim 3 wherein said auxiliary bladders include means to impede expansion of said cooperating outer wall of said auxiliary bladder.

8. A pressure applying garment as defined in claim 4 wherein said auxiliary bladders include means to impede expansion of said cooperating outer wall of said auxiliary bladder.

9. A pressure applying garment as defined in claim 5 wherein said means to impede expansion of said cooperating outer wall of said auxiliary bladder comprises a stiffener panel interposed in said garment in facing relationship to said outer cooperating wall of said auxiliary bladder.

10. A pressure applying garment as defined in claim 6 wherein said means to impede expansion of said cooperating outer wall of said auxiliary bladder comprises a stiffener panel interposed in said garment in facing relationship to said outer cooperating wall of said auxiliary bladder.

11. A pressure applying garment as defined in claim 7 wherein said means to impede expansion of said cooperating outer wall of said auxiliary bladder comprises a stiffener panel interposed in said garment in facing relationship to said outer cooperating wall of said auxiliary bladder.

12. A pressure applying garment as defined in claim 8 wherein said means to impede expansion of said cooperating outer wall of said auxiliary bladder comprises a stiffener panel interposed in said garment in facing relationship to said outer cooperating wall of said auxiliary bladder.

13. A pressure applying garment as defined in claim 1 further comprising substantially parallel elongated stiffener elements positioned in space relationship around the circumference of said garment and having their longitudinal axis extending substantially perpendicular to the circumferential direction of said garment.

14. A pressure applying garment as defined in claim 2 further comprising substantially parallel elongated stiffener elements positioned in space relationship around the circumference of said garment and having their longitudinal axis extending substantially perpendicular to the circumferential direction of said garment.

15. A pressure applying garment as defined in claim 3 further comprising substantially parallel elongated stiffener elements positioned in space relationship around the circumference of said garment and having their longitudinal axis extending substantially perpendicular to the circumferential direction of said garment.

16. A pressure applying garment as defined in claim 4 further comprising substantially parallel elongated stiffener elements positioned in space relationship around the circumference of said garment and having their longitudinal axis extending substantially perpendicular to the circumferential direction of said garment.

17. A pressure applying garment as defined in claim 3 wherein said connecting means comprises welds.

18. A pressure applying garment as defined in claim 4 wherein said connecting means comprises welds.

19. A pressure applying garment as defined in claim 7 wherein said connecting means comprises welds.

20. A pressure applying garment as defined in claim 8 wherein said connecting means comprises welds.

* * * * *